(12) United States Patent
Prümm et al.

(10) Patent No.: US 10,436,130 B2
(45) Date of Patent: Oct. 8, 2019

(54) COMBUSTION ENGINE, IN PARTICULAR GAS ENGINE, FOR A VEHICLE, IN PARTICULAR FOR A COMMERCIAL VEHICLE

(71) Applicant: MAN Truck & Bus AG, München (DE)

(72) Inventors: Franz Werner Prümm, Nürnberg (DE); Bruno Barciela, Nürnberg (DE); Joachim Weiß, Oberasbach (DE)

(73) Assignee: MAN TRUCK & BUS AG, München (DE)

( * ) Notice: Subject to any disclaimer, the term of this patent is extended or adjusted under 35 U.S.C. 154(b) by 94 days.

(21) Appl. No.: 14/851,550

(22) Filed: Sep. 11, 2015

(65) Prior Publication Data

US 2016/0076467 A1 Mar. 17, 2016

(30) Foreign Application Priority Data

Sep. 12, 2014 (DE) .................. 10 2014 013 284

(51) Int. Cl.
*F02D 41/00* (2006.01)
*F02D 19/02* (2006.01)
(Continued)

(52) U.S. Cl.
CPC ......... *F02D 41/0007* (2013.01); *F02D 19/02* (2013.01); *F02D 41/0027* (2013.01);
(Continued)

(58) Field of Classification Search
CPC ............. F02D 41/0027; F02D 41/0065; F02D 41/0072; F02D 2041/0067;
(Continued)

(56) References Cited

U.S. PATENT DOCUMENTS 6,035,639 A * 3/2000 Kolmanovsky ......... F02B 37/24
60/605.2
6,098,602 A * 8/2000 Martin ................ F02D 41/0072
123/568.23

(Continued)

FOREIGN PATENT DOCUMENTS

CN 101278112 A 10/2008
CN 101415924 A 4/2009
(Continued)

OTHER PUBLICATIONS

Chinese Office Action, dated Jan. 3, 2019, 5 Pages.

*Primary Examiner* — John M Zaleskas
(74) *Attorney, Agent, or Firm* — Lucas & Mercanti, LLP

(57) ABSTRACT

A combustion engine for a vehicle has an intake duct through which a fuel gas/air/exhaust gas mixture can be fed to a combustion unit of the combustion engine, and an exhaust gas recirculation system feeding in an exhaust gas from the combustion unit at an exhaust gas admission region to the gas fed to the combustion unit. A measuring device that determines the fuel gas/air/exhaust gas mass flow and the fuel gas/air/exhaust gas temperature is arranged in the intake duct upstream of the combustion unit and downstream of the exhaust gas admission region. A temperature sensor is arranged both in the exhaust gas recirculation system and in the intake duct, in each case upstream of the exhaust gas admission region, in addition to the measuring device, to determine a recirculated exhaust gas mass flow and/or an air mass flow fed to the combustion unit.

18 Claims, 1 Drawing Sheet

(51) Int. Cl.
*F02M 26/05* (2016.01)
*F02M 26/47* (2016.01)
*F02D 41/14* (2006.01)

(52) U.S. Cl.
CPC ..... *F02D 41/0065* (2013.01); *F02D 41/0072* (2013.01); *F02M 26/05* (2016.02); *F02M 26/47* (2016.02); *F02D 41/1445* (2013.01); *F02D 41/1446* (2013.01); *F02D 2041/0067* (2013.01); *F02D 2041/0075* (2013.01); *Y02T 10/32* (2013.01); *Y02T 10/47* (2013.01)

(58) Field of Classification Search
CPC ..... F02D 2041/0075; F02D 2200/0406; F02D 2200/0414; F02D 19/02; F02M 26/47; Y02T 10/32
USPC ............ 123/568.11, 568.12, 568.21, 568.22; 701/108; 60/605.2
See application file for complete search history.

(56) References Cited

U.S. PATENT DOCUMENTS

| | | | | |
|---|---|---|---|---|
| 6,116,083 | A * | 9/2000 | Cullen | F02D 41/0072 73/114.69 |
| 6,370,935 | B1 * | 4/2002 | He | F02D 41/0055 702/100 |
| 6,715,287 | B1 | 4/2004 | Engel | |
| 6,742,335 | B2 * | 6/2004 | Beck | F01N 3/021 123/568.11 |
| 6,848,434 | B2 * | 2/2005 | Li | F02M 26/47 123/568.12 |
| 7,296,562 | B2 | 11/2007 | Withrow et al. | |
| 7,512,479 | B1 * | 3/2009 | Wang | F02M 26/47 123/568.21 |
| 7,587,892 | B2 * | 9/2009 | Dye | F01N 3/023 60/274 |
| 8,515,650 | B2 | 8/2013 | Kato | |
| 2002/0059797 | A1 * | 5/2002 | Kreso | F02B 37/24 60/602 |
| 2002/0169573 | A1 * | 11/2002 | Reuschenbach | F02D 41/0072 702/100 |
| 2003/0041845 | A1 * | 3/2003 | Akao | F02D 41/0072 123/568.16 |
| 2003/0075158 | A1 * | 4/2003 | Milos | F02D 41/0072 123/568.21 |
| 2004/0084030 | A1 * | 5/2004 | Matsunaga | F02D 41/0072 123/568.12 |
| 2004/0186658 | A1 * | 9/2004 | Wild | F02D 41/0072 701/114 |
| 2005/0066658 | A1 * | 3/2005 | Longnecker | F02D 23/00 60/602 |
| 2005/0228573 | A1 * | 10/2005 | Gangopadhyay | F02D 41/0052 701/108 |
| 2006/0042608 | A1 * | 3/2006 | Buck | F02B 29/0437 123/568.12 |
| 2006/0218922 | A1 * | 10/2006 | Bauer | F02B 1/12 60/605.2 |
| 2007/0079598 | A1 | 4/2007 | Bailey et al. | |
| 2007/0227139 | A1 * | 10/2007 | Withrow | F01N 11/002 60/599 |
| 2008/0243361 | A1 * | 10/2008 | Wang | F02B 37/22 701/103 |
| 2009/0076713 | A1 * | 3/2009 | Bailey | F02B 19/12 701/103 |
| 2009/0090106 | A1 * | 4/2009 | Muller | F02B 37/12 60/602 |
| 2009/0125217 | A1 * | 5/2009 | Nam | F02D 41/0052 701/108 |
| 2009/0164105 | A1 * | 6/2009 | Ma | F02D 41/0072 701/108 |
| 2009/0223495 | A1 * | 9/2009 | Ohata | F02D 41/0055 123/568.12 |
| 2010/0042284 | A1 * | 2/2010 | Sasaki | F02D 41/0052 701/31.4 |
| 2010/0131181 | A1 * | 5/2010 | Herrmann | F02M 26/47 701/108 |
| 2010/0242936 | A1 * | 9/2010 | Zurlo | F02D 41/0052 123/704 |
| 2011/0251825 | A1 * | 10/2011 | Nagoshi | F02D 41/222 702/183 |
| 2012/0272938 | A1 * | 11/2012 | Blumendeller | F02D 21/08 123/568.11 |
| 2013/0074492 | A1 * | 3/2013 | Chi | F02B 37/18 60/602 |
| 2013/0074495 | A1 * | 3/2013 | Chi | F02B 37/10 60/605.2 |
| 2013/0074496 | A1 * | 3/2013 | Chi | F02B 37/04 60/605.2 |
| 2013/0080034 | A1 * | 3/2013 | Chi | F02D 41/0065 701/108 |
| 2013/0268176 | A1 * | 10/2013 | Song | F02M 35/10393 701/102 |
| 2015/0046064 | A1 * | 2/2015 | Lahti | F02M 26/02 701/103 |
| 2015/0101580 | A1 * | 4/2015 | Sorge | F02D 41/0072 123/568.21 |
| 2015/0142338 | A1 * | 5/2015 | Nakano | F02D 41/0065 702/35 |
| 2015/0152801 | A1 * | 6/2015 | Racelis | F02D 41/2474 123/349 |
| 2015/0152802 | A1 * | 6/2015 | Racelis | F02D 41/222 701/102 |
| 2015/0260120 | A1 * | 9/2015 | Prumm | F02B 29/0406 123/350 |
| 2016/0053724 | A1 * | 2/2016 | Flohr | F02D 41/0027 123/528 |

FOREIGN PATENT DOCUMENTS

| | | | |
|---|---|---|---|
| CN | 102449292 A | 5/2012 | |
| FR | 2892150 A1 * | 4/2007 | ......... F02D 41/0072 |
| FR | 2901312 A1 * | 11/2007 | ......... F02D 41/0072 |
| JP | WO 2014010361 A1 * | 1/2014 | ......... F02D 41/10 |
| RU | 2264550 C2 | 2/2004 | |
| WO | WO 2008107247 A1 * | 9/2008 | ......... F02B 29/0437 |
| WO | WO 2009043513 A1 * | 4/2009 | ......... F02D 35/023 |
| WO | 2013175779 A1 | 11/2013 | |

* cited by examiner

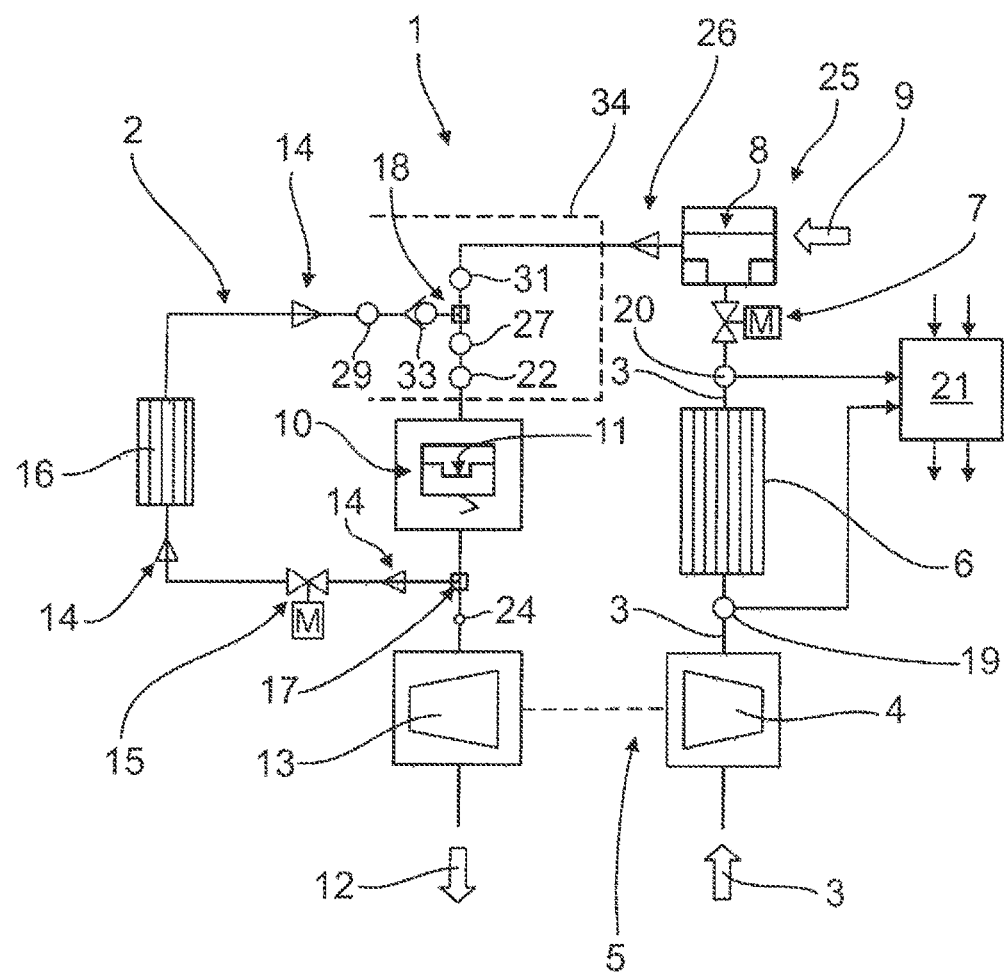

COMBUSTION ENGINE, IN PARTICULAR GAS ENGINE, FOR A VEHICLE, IN PARTICULAR FOR A COMMERCIAL VEHICLE

CROSS REFERENCE TO RELATED APPLICATIONS

The present application claims priority of DE 10 2014 013 284.6, filed Sep. 12, 2014, which is incorporated herein by reference.

BACKGROUND OF THE INVENTION

The invention relates to a combustion engine, in particular a gas engine, for a vehicle, in particular for a commercial vehicle, a method for operating a combustion engine, in particular a gas engine, and a vehicle, in particular a commercial vehicle, having the combustion engine and/or for carrying out the method.

To satisfy exhaust gas regulations that have to be met, one known practice is to convert gas engines or fuel gas engines, e.g., natural gas engines, from a lean-mix mode of operation to a stoichiometric mode of operation. A cooled and controlled exhaust gas recirculation system (EGR), which feeds back some of an exhaust gas from the gas engine to an intake of the gas engine, for example, is suitable for compensating the resulting loss of efficiency of the gas engine or for increasing the efficiency of the gas engine. During the subsequent combustion in a cylinder-piston unit of the gas engine, the recirculated exhaust gas acts substantially as an inert gas.

In gas engines without EGR and with the fuel gas being fed into an intake duct of the gas engine, a charge mixture mass flow fed to the cylinder-piston unit is generally calculated by a volumetric efficiency model implemented in a control unit, which reflects the displacement of the engine as a function of engine speed. For this purpose, the charge mixture pressure (manifold absolute pressure or MAP) and the charge mixture temperature in the intake duct are first of all measured in the region of the cylinder-piston unit by a pressure sensor and a temperature sensor. Using the volumetric efficiency model, the charge mixture mass flow supplied can be calculated from the measured charge mixture pressure, the charge mixture temperature, and the speed of the engine. Using the combustion air ratio, an air mass flow fed to the cylinder-piston unit can then also be calculated. However, this procedure is not possible in the case of gas engines with EGR since the exhaust gas fraction in the charge mixture formed, for example, as a fuel gas/air/exhaust gas mixture is not known.

In the case of gas engines with EGR, the usual practice for determining the air mass flow is therefore to measure the air mass flow in the intake duct by an air mass meter, e.g., by a hot film air mass meter, upstream of the EGR and upstream of the fuel gas supply. Using the measured air mass flow and of the charge mixture mass flow determined by the volumetric efficiency model already mentioned, the recirculated exhaust gas mass flow can then also be determined. However, measurement of the air mass flow by the air mass meter has proven very prone to faults, particularly owing to the sensitivity thereof to dirt.

BRIEF SUMMARY OF THE INVENTION

An object of the invention is to provide a combustion engine, in particular a gas engine, for a vehicle, in particular for a commercial vehicle, and a method for operating the combustion engine in which the air mass flow fed to the combustion unit and/or the recirculated exhaust gas mass flow is/are determined in an alternative, reliable and, at the same time, low-cost manner.

The object is met by a combustion engine, in particular a gas engine, for a vehicle, in particular for a commercial vehicle, having an intake duct through which a gas, in particular a fuel gas/air/exhaust gas mixture, can be fed to a combustion unit, in particular a cylinder-piston unit, of the combustion engine, and having an exhaust gas recirculation system, by means of which an exhaust gas from the combustion unit can be fed in at an exhaust gas admission region to the gas, in particular a fuel gas/air/exhaust gas mixture, fed to the combustion unit, wherein at least one measuring device that determines the gas mass flow, in particular fuel gas/air/exhaust gas mass flow, and the gas temperature, in particular fuel gas/air/exhaust gas temperature, is arranged in the intake duct upstream of the combustion unit and downstream of the exhaust gas admission region. According to the invention, at least one temperature sensor is arranged both in the exhaust gas recirculation system and in the intake duct, in each case upstream of the exhaust gas admission region, in addition to the measuring device, in particular in order to determine the recirculated exhaust gas mass flow and/or an air mass flow fed to the combustion unit.

In this way, the recirculated exhaust gas mass flow and the air mass flow fed to the combustion unit can be determined in a particularly low-cost and reliable manner since there is no need to provide an air mass meter for measuring the air mass flow, for example, in order to achieve this. Instead, the significantly more reliable and less expensive temperature sensors are used. Moreover, the use of the temperature sensors is also a particularly simple alternative to the air mass meter since the measuring device which is usually already provided in the intake duct in any case is used to determine the recirculated exhaust gas mass flow and the air mass flow supplied.

Using the currently recirculated exhaust gas mass flow determined and the determined air mass flow currently being fed to the combustion unit, it is then possible, for example, to adjust the recirculated exhaust gas mass flow and the air mass flow to defined setpoints by an engine control unit in a closed control loop. These setpoints can be dependent on the current mode of operation of the combustion engine and also on further parameters, for example.

From the recirculated exhaust gas mass flow determined and the air mass flow determined, it is furthermore also possible to calculate the current exhaust gas recirculation rate, for example.

In a specific embodiment of the combustion engine according to the invention, a control unit is provided, which calculates the recirculated exhaust gas mass flow and/or the air mass flow fed to the combustion unit from the variables determined by the measuring device and the temperature sensors and from the combustion air ratio, which is preset and/or measured by a lambda probe. A control unit of this kind makes it is possible for the recirculated exhaust gas mass flow and/or the air mass flow to be calculated from the measured variables in a simple and automatic or autonomous way.

The measuring device and the temperature sensors are preferably arranged in a defined region of proximity, preferably in a region of direct proximity, to the exhaust gas admission region in order to determine the recirculated exhaust gas quantity and the air fraction in the gas fed to the combustion unit with a particularly high accuracy.

The measuring device for determining the gas mass flow, in particular fuel gas/air/exhaust gas mass flow, preferably has a pressure sensor, in particular a MAP sensor, arranged in the intake duct, via which the gas pressure, in particular fuel gas/air/exhaust gas pressure, can be measured. Using a control unit, it is then possible for the gas mass flow, in particular fuel gas/air/exhaust gas mass flow, to be calculated, in particular by a volumetric efficiency model, from the gas pressure, in particular fuel gas/air/exhaust gas pressure, measured by the pressure sensor, the temperature measured by the measuring device and the speed of the combustion engine. In this way, the gas mass flow can be determined reliably and, at the same time, also at particularly low cost.

The measuring device for measuring the temperature can preferably have a temperature sensor in order to determine the temperature in a simple manner and with a high accuracy.

According to a further embodiment, the temperature sensor arranged in the exhaust gas recirculation system upstream of the exhaust gas admission region is arranged downstream of an exhaust gas cooling device in the exhaust gas recirculation system and/or upstream of a nonreturn valve in the exhaust gas recirculation system in order to determine the recirculated exhaust gas mass flow and the air mass flow fed to the combustion unit with a high accuracy.

The temperature sensor arranged in the intake duct upstream of the exhaust gas admission region is furthermore preferably arranged downstream of a fuel gas/air mixing device and/or of a throttle valve and/or of a charge air cooling device and/or of a compressor of an exhaust turbocharger in the intake duct. The accuracy with which the recirculated exhaust gas mass flow and the air mass flow fed to the combustion unit are determined can thereby be increased further.

Fundamentally, it should be noted that the measuring device and the temperature sensors should preferably be arranged in such a way that the change in gas energy and gas mass while the gases are flowing from the temperature sensors to the measuring device is as small as possible. The recirculated exhaust gas mass flow and the air mass flow supplied can then be determined with a high accuracy.

In another preferred embodiment, the recirculated exhaust gas mass flow and/or the air mass flow fed to the combustion unit can additionally be determined and/or can also be determined in accordance with defined operating states of the combustion engine, as an alternative to the manner explained above. It is thereby possible, for example, to carry out a plausibility check in respect of the values determined. It is likewise also possible, for example, to use or not to use the alternatively and/or additionally determined exhaust gas mass flow and/or the alternatively and/or additionally determined air mass flow in the open-loop and/or closed-loop control of the combustion engine, depending on the operating mode of the combustion engine. Thus, it is possible to use the more reliable or more accurate values for closed-loop control of the combustion engine, for example, depending on the operating mode of the combustion engine. To be specific, the alternative and/or additional determination of the recirculated exhaust gas mass flow and/or of the air mass flow fed to the combustion unit can here be accomplished by a charge air cooler model implemented in a control unit and/or by a throttle valve model implemented in a control unit, for example.

In the present case, a model based on a particular component, e.g., the abovementioned charge air cooler model or the abovementioned throttle valve model, is always a mathematical function and/or characteristic or characteristic maps stored in a processing unit and describing the component, by means of which a process variable is calculated in accordance with predefined input signals.

The object is also achieved by a method for operating a combustion engine, in particular a gas engine, for a vehicle, in particular for a commercial vehicle, the engine having an intake duct, through which a gas, in particular a fuel gas/air/exhaust gas mixture, is fed to a combustion unit, in particular a cylinder-piston unit, of the combustion engine, and having an exhaust gas recirculation system, by means of which an exhaust gas from the combustion unit is fed in at an exhaust gas admission region to the gas fed to the combustion unit. According to the method, a recirculated exhaust gas mass flow and/or an air mass flow fed to the combustion unit is determined by a measuring and control device from the gas mass flow, in particular fuel gas/air/exhaust gas mass flow, and the gas temperature, in particular fuel gas/air/exhaust gas temperature, in the intake duct upstream of the combustion unit and downstream of the exhaust gas admission region, from the exhaust gas temperature in the exhaust gas recirculation system upstream of the exhaust gas admission region and from the gas temperature, in particular fuel gas/air temperature, in the intake duct upstream of the exhaust gas admission region.

As already explained, the recirculated exhaust gas mass flow and the air mass flow fed to the combustion unit can thereby be determined in a particularly low-cost and reliable manner.

In a preferred procedure, in the calculation, a mass flow balance and an energy balance are performed, in particular in a defined region of proximity and/or region of direct proximity, in the region of the exhaust gas admission region, wherein the exhaust gas mass flow in the exhaust gas recirculation system, the gas mass flow, in particular fuel gas/air mass flow, in the intake duct upstream of the exhaust gas admission region, and the gas mass flow, in particular fuel gas/air/exhaust gas mass flow, in the intake duct downstream of the exhaust gas admission region and upstream of the combustion unit are taken into account in the mass flow balance and the energy balance. By the mass flow balance and the energy balance in the region of the exhaust gas admission region, the recirculated exhaust gas mass flow and the air mass flow fed to the combustion unit can be calculated in a simple manner using the measured variables.

To be specific, the gas mass flow in the intake duct upstream of the exhaust gas admission region can be a fuel gas/air mixture with a defined combustion air ratio, for example, in the case of a combustion engine designed as a gas engine. In the calculation, the fuel gas mass flow fed to the combustion unit is then preferably expressed by way of the combustion air ratio as a function of the air mass flow fed to the combustion unit in order to calculate the recirculated exhaust gas mass flow and the air mass flow fed to the combustion unit in a simple manner.

To determine the gas mass flow, in particular the fuel gas/air/exhaust gas mass flow, upstream of the combustion unit and downstream of the exhaust gas admission region, a preferred possibility is for the gas pressure, in particular fuel gas/air/exhaust gas pressure, in the intake duct upstream of the combustion unit and downstream of the exhaust gas admission region to be measured, wherein the gas mass flow, in particular fuel gas/air/exhaust gas mass flow, is calculated by the measuring and control device, in particular by a volumetric efficiency model, from the measured gas pressure, in particular fuel gas/air/exhaust gas pressure, from the temperature measured by the measuring and control device and from the speed of the combustion engine. As already explained, it is thereby possible to determine the gas mass flow in a particularly low-cost and reliable manner.

A measuring device is furthermore preferably provided, in which the recirculated exhaust gas mass flow and the air mass flow fed to the combustion unit can additionally be determined and/or can alternatively also be determined in accordance with the operation of the combustion engine. The resulting advantages have likewise already been explained. To be specific, the alternative and/or additional determination of the recirculated exhaust gas mass flow and of the air mass flow fed to the combustion unit can be accomplished here by a charge air cooler model implemented in a control unit and/or by a throttle valve model implemented in a control unit, for example.

As a particularly preferred option, the alternatively and/or additionally determined recirculated exhaust gas mass flow is used or not used in the closed-loop and/or open-loop control of the recirculated exhaust gas mass flow in accordance with defined operating states of the combustion engine. It is likewise possible, in the closed-loop control and/or open-loop control of the air mass flow fed to the combustion unit for the alternatively and/or additionally determined air mass flow supplied to be used or not used in accordance with defined operating states of the combustion engine. In this way, the closed-loop control and/or open-loop control of the recirculated exhaust gas quantity and/or of the air mass flow supplied can be improved in the manner already explained.

The object of the invention is also met by a vehicle, in particular a commercial vehicle, having the combustion engine according to the invention. The resulting advantages are identical with the already acknowledged advantages of the combustion engine according to the invention, and therefore these are not repeated here.

With the exception, for example, of cases of clear dependence or irreconcilable alternatives, the advantageous embodiments and/or developments of the invention explained above and/or given in the dependent claims can be used individually or, alternatively, in any combination with one another.

BRIEF DESCRIPTION OF THE DRAWINGS

The invention and the advantageous embodiments and/or developments thereof and the advantages thereof are explained in greater detail purely by way of example below with reference to a drawing, which is a schematic diagram of an engine according to an embodiment of the invention.

DETAILED DESCRIPTION OF THE PREFERRED EMBODIMENTS

The single FIGURE shows a schematic representation of an illustrative embodiment of a combustion engine according to the invention, which is here designed as a natural gas engine 1 with a controlled and cooled exhaust gas recirculation system 2.

An air mass flow (arrow 3) is fed to an engine block 10 via an intake duct 25, wherein the air mass flow 3 in this case first of all flows through a compressor 4, which is part of an exhaust turbocharger 5, and then through a charge air cooler 6. From there, the cooled air mass flow 3 flows via a controllable throttle valve 7 to a gas mixer 8, to which a natural gas mass flow (arrow 9) is furthermore fed. From the gas mixer 8, the natural gas/air mixture 26 formed there flows to a cylinder-piston unit 11, in which the combustion process takes place. An exhaust gas mass flow (arrow 12) then flows via a turbine 13 of the exhaust turbocharger 5, wherein the turbine 13 is coupled mechanically to the compressor 4 and drives the latter.

Under the control of an EGR control valve 15, some of the exhaust gas mass flow is diverted as an EGR mass flow 14 at a branch point 17 upstream of the turbine 13. This EGR mass flow 14 flows in the exhaust gas recirculation system 2 via the EGR control valve 15, an EGR cooler 16 and a nonreturn valve, in this case a flutter valve 33 for example, to an exhaust gas admission region 18, which is arranged in the intake duct downstream of the gas mixer 8 and upstream of the engine block 10, with the result that the EGR mass flow 14 is added to the natural gas/air mixture 26. Owing to the feeding of the natural gas into the intake duct 25, the air/natural gas/exhaust gas mixture is here formed outside the cylinder-piston unit 11, and this is therefore external mixture formation. As an alternative, the natural gas can also be fed to the cylinder-piston unit 11 or injected into the combustion chambers of the cylinder-piston unit 11, with the result that the air/natural gas/exhaust gas mixture is formed only in the combustion chambers of the cylinder-piston unit 11. In this case, there is internal mixture formation.

Arranged in the intake duct 25 between the engine block 10 and the exhaust gas admission region 18 there is furthermore a pressure sensor 22, preferably a MAP intake manifold pressure sensor, that measures the charge mixture pressure. A temperature sensor 27 that measures the charge mixture temperature is furthermore arranged in the intake duct 25 between the engine block 10 and the exhaust gas admission region 18, A temperature sensor 31 that measures the charge mixture temperature is arranged in the intake duct 25 upstream of the exhaust gas admission region 18 and downstream of the gas mixer 8. A temperature sensor 29 that measures the exhaust gas temperature is also arranged in the exhaust gas recirculation system 2 upstream of the flutter valve 33 and downstream of the EGR cooler 16.

The temperature sensors 27, 29 and 31 just described and the pressure sensor 22 are connected for signal transmission to a control unit 21, and therefore the measured variables thereof are transmitted to the control unit 21. A volumetric efficiency model, by means of which the charge mixture mass flow consisting of fresh air, fuel gas and recirculated exhaust gas can be determined from the charge mixture pressure measured by the pressure sensor 22 and from the charge mixture temperature measured by temperature sensor 27, can be implemented by the control unit 21. The EGR mass flow 14 and the air mass flow 3 can then be calculated by the control unit 21 from the temperatures measured by temperature sensors 27, 29 and 31, from the calculated charge mixture mass flow and from the combustion air ratio λ of the air/natural gas mixture measured, for example, by a lambda probe 24. To be specific, this calculation can be performed using a mass flow balance and an energy balance, for example, in the system boundary 34 indicated by the dashed lines. For this purpose, the following formulae can be used, for example:

$$\dot{m}_{total} = \dot{m}_{EGR} + \dot{m}_{air} + \dot{m}_{fuel\ gas}$$

$$(\dot{m}_{air} \times c_{p,air} \times T_{BL}) + (\dot{m}_{fuel\ gas} \times c_{p,fuel\ gas} \times T_{BL}) + (\dot{m}_{EGR} \times c_{p,EGR} \times T_{EGR}) = (\dot{m}_{total} \times c_{p,total} \times T_{total})$$

$$\lambda = \dot{m}_{air} / (L_{min} \times \dot{m}_{fuel\ gas})$$

As a further option, there is also the possibility of arranging a pressure sensor 19 upstream of the charge air cooler 6 and a pressure sensor 20 downstream of the charge air cooler 6 in the intake duct 25, which measure the pressure loss in the air mass flow 3 across the charge air cooler 6. The measurement signals from the pressure sensors 19, 20 corresponding to a differential pressure are fed to a charge air cooler model, which is implemented in the control unit 21 and which calculates the air mass flow 3 flowing through the charge air cooler 6 from the measured differential pressure. From the calculated air mass flow 3, the charge mixture mass flow calculated by the volumetric efficiency model, and the combustion air ratio, it is then likewise possible to calculate the EGR mass flow 14.

The pressure sensors 19, 20 just described and the charge air cooler model allow alternative or additional determination of the air mass flow 3 and of the EGR mass flow 14. Thus, a plausibility check in respect of the values determined by sensors 22, 27, 29 and 31 can be carried out, for example. It is likewise possible, for example, to use or not to use the alternatively or additionally determined values or the values determined by sensors 22, 27, 29 and 31 in the closed-loop control of the air mass flow 3 and of the EGR mass flow 14, depending on the operating mode of the natural gas engine 1. Thus, for example, the values which are shown by experience to be more reliable and/or more accurate can be used for this closed-loop control, for example, depending on the operating mode of the natural gas engine 1.

As an alternative or in addition to determining the air mass flow 3 by the charge air cooler model, the air mass flow 3 can also be determined by a throttle valve model implemented in the control unit 21, for example. This throttle valve model has the pressure loss across the throttle valve 7 and the current throttle valve position as input variables. In this case, measurement of the pressure loss across the throttle valve 7 can be performed by the pressure sensor 20 arranged upstream of the throttle valve 7 and by a pressure sensor (not shown in the FIGURE) arranged in the intake duct 25 between the throttle valve 7 and the gas mixer 8.

LIST OF REFERENCE SIGNS 1 natural gas engine
2 exhaust gas recirculation system
3 arrow (air mass flow)
4 compressor
5 exhaust turbocharger
6 charge air cooler
7 throttle valve
8 as mixer
9 arrow (natural gas mass flow)
10 engine block
11 cylinder-piston unit
12 arrow (exhaust gas mass flow)
13 turbine
14 EGR mass flow
15 EGR control valve
16 EGR cooler
17 branch point
18 exhaust gas admission region
19 pressure sensor
20 pressure sensor
21 processing unit
22 pressure sensor
24 lambda probe
25 intake duct
26 natural gas/air mixture
27 temperature sensor
29 temperature sensor
31 temperature sensor
33 flutter valve
$c_{p,EGR}$ specific heat capacity of exhaust gas
$c_{p,fuel\ gas}$ specific heat capacity of fuel gas
$c_{p,total}$ specific heat capacity of charge mixture
$c_{p,air}$ specific heat capacity of air
$L_{min}$ minimum air requirement
$\dot{m}_{EGR}$ EGR mass flow
$\dot{m}_{fuel\ gas}$ fuel gas mass flow
$\dot{m}_{total}$ charge mixture mass flow
$\dot{m}_{air}$ air mass flow
$T_{EGR}$ temperature of recirculated exhaust gas
$T_{BL}$ temperature of fuel gas/air mixture
$T_{total}$ temperature of charge mixture
$\lambda$ combustion air ratio

The invention claimed is:

1. A combustion engine for a vehicle, comprising:
a combustion unit;
an intake duct feeding a fuel gas/air/exhaust gas mixture to the combustion unit;
an exhaust gas recirculation system feeding an exhaust gas from the combustion unit to an exhaust gas admission region of the intake duct to a fuel gas/air mixture fed to the combustion unit;
a gas pressure sensor measuring a gas pressure of the fuel gas/air/exhaust gas mixture and a gas temperature sensor measuring a gas temperature of the fuel gas/air/exhaust gas mixture, each of the gas pressure sensor and the gas temperature sensor arranged in the intake duct upstream of the combustion unit and downstream of the exhaust gas admission region;
a first temperature sensor arranged in the exhaust gas recirculation system and a second temperature sensor arranged in the intake duct, each of the first temperature sensor and the second temperature sensor being arranged upstream of the exhaust gas admission region;
a control unit configured to calculate a first recirculated exhaust gas mass flow rate fed to the combustion unit using the variables determined by the gas pressure sensor, the gas temperature sensor, the first temperature sensor, and the second temperature sensor, and a combustion air ratio ($\lambda$), which is one of preset and measured by a lambda probe, the control unit being further configured to calculate a first air mass flow rate fed to the combustion unit using the variables determined by the gas pressure sensor, the gas temperature sensor, the first temperature sensor, and the second temperature sensor, and the combustion air ratio ($\lambda$), and the control unit controlling an exhaust gas recirculation valve and a throttle valve to adjust the recirculated exhaust mass flow rate and the air mass flow rate, respectively, to defined setpoints;
a measuring device from which a second recirculated exhaust gas mass flow rate and a second air mass flow rate fed to the combustion unit is determined; and
a charge air cooler model and a throttle valve model implemented in the control unit, the second recirculated exhaust gas mass flow rate and the second air mass flow rate fed to the combustion unit being determined in accordance with a defined operating state of the combustion engine and using the charge air cooler model and the throttle valve model.

2. The combustion engine according to claim 1, wherein the combustion engine is a gas engine for a commercial vehicle and the combustion unit is a cylinder-piston unit of the combustion engine.

3. The combustion engine according to claim 1, wherein the control unit further calculates a gas mass flow rate of the fuel gas/air/exhaust gas mixture by a volumetric efficiency model from the gas pressure measured by the gas pressure sensor, the temperature measured by the gas temperature sensor, and a speed of the combustion engine.

4. The combustion engine according to claim 1, wherein the gas pressure sensor is a MAP sensor.

5. The combustion engine according to claim 1, wherein the first temperature sensor is arranged one of downstream of an exhaust gas cooling device in the exhaust gas recirculation system and upstream of a nonreturn valve in the exhaust gas recirculation system.

6. The combustion engine according to claim 1, wherein the second temperature sensor is arranged downstream of at least one of a fuel gas/air mixing device, the throttle valve, a charge air cooling device, and a compressor of an exhaust turbocharger in the intake duct.

7. The combustion engine according to claim 1, wherein the control unit calculates each of the first recirculated exhaust gas mass flow rate and the first air mass flow rate using a mass flow balance and energy balance of a system including the intake duct upstream of the exhaust gas admission region, the intake duct downstream of the exhaust gas admission region and upstream of the combustion chamber, and the exhaust gas recirculation system feeding the exhaust gas admission region.

8. The combustion engine according to claim 1, wherein the control unit is configured to carry out a plausibility check of the first recirculated exhaust gas mass flow rate using the second recirculated exhaust gas mass flow rate and to carry out a plausibility check of the first air mass flow rate using the second air mass flow rate.

9. The combustion engine according to claim 1, wherein the control unit is configured to use or not use the second recirculated exhaust gas mass flow rate and the second air mass flow rate for controlling the combustion engine depending on the operation mode of the combustion engine.

10. A method for operating a combustion engine, comprising a combustion unit; an intake duct feeding a fuel gas/air/exhaust gas mixture to the combustion unit; an exhaust gas recirculation system feeding an exhaust gas from the combustion unit at an exhaust gas admission region to the gas fed to the combustion unit; a gas pressure sensor measuring a gas pressure of the fuel gas/air/exhaust gas mixture, a gas temperature sensor measuring a gas temperature of the fuel gas/air/exhaust gas mixture, each of the gas pressure sensor and the gas temperature sensor arranged in the intake duct upstream of the combustion unit and downstream of the exhaust gas admission region; and a first temperature sensor arranged in the exhaust gas recirculation system and a second temperature sensor arranged in the intake duct, each of the first temperature sensor and the second temperature sensor being arranged upstream of the exhaust gas admission region, the method comprising the steps of:

- determining, by the gas pressure sensor, the gas pressure of the fuel gas/air/exhaust gas mixture and, by the gas temperature sensor, the gas temperature of the fuel gas/air/exhaust gas mixture, in the intake duct upstream of the combustion unit and downstream of the exhaust gas admission region;
- determining, by the first temperature sensor, an exhaust gas temperature in the exhaust gas recirculation system upstream of the exhaust gas admission region and, by the second temperature sensor, a gas temperature of a fuel gas/air mixture in the intake duct upstream of the exhaust gas admission region;
- calculating, by a control unit, a first recirculated exhaust gas mass flow rate fed to the combustion unit using the gas pressure of the fuel gas/air/exhaust gas mixture determined by the gas pressure sensor, the gas temperature of the fuel gas/air/exhaust gas mixture determined by the gas temperature sensor, the exhaust gas temperature in the exhaust gas recirculation system determined by the first temperature sensor, the gas temperature in the intake duct determined by the second temperature sensor, and a combustion air ratio ($\lambda$), which is one of preset and measured by a lambda probe;
- calculating, by the control unit, a first air mass flow rate fed to the combustion unit using the gas pressure of the fuel gas/air/exhaust gas mixture determined by the gas pressure sensor, the gas temperature of the fuel gas/air/exhaust gas mixture determined by the gas temperature sensor, the exhaust gas temperature in the exhaust gas recirculation system determined by the first temperature sensor, the gas temperature in the intake duct determined by the second temperature sensor, and the combustion air ratio; and
- adjusting, using the control unit or an engine control unit, the recirculated exhaust gas mass flow rate and the air mass flow rate to the combustion unit to respective defined setpoints; and
- determining a second recirculated exhaust gas mass flow rate and a second air mass flow rate fed to the combustion unit using a measuring device and a charge air cooler model implemented in the control unit and a throttle valve model implemented in the control unit.

11. The method according to claim 10, wherein during the steps of calculating, a mass flow balance and an energy balance are performed proximate the region of the exhaust gas admission region taking into account the recirculated exhaust gas mass flow rate in the exhaust gas recirculation system, a gas mass flow rate of the fuel gas/air mixture in the intake duct upstream of the exhaust gas admission region, and a gas mass flow rate of the fuel gas/air/exhaust gas mixture in the intake duct downstream of the exhaust gas admission region and upstream of the combustion unit.

12. The method according to claim 11, wherein the gas mass flow rate of the fuel gas/air mixture in the intake duct upstream of the exhaust gas admission region is a fuel gas/air mixture with a defined combustion air ratio ($\lambda$), wherein in the step of calculating, the fuel gas mass flow rate supplied is expressed by a combustion air ratio as a function of the air mass flow rate supplied.

13. The method according to claim 10, wherein a gas mass flow rate of the fuel gas/air/exhaust gas mixture is calculated by a volumetric efficiency model from the gas pressure of the fuel gas/air/exhaust gas mixture measured by the gas pressure sensor, the gas temperature of the fuel gas/air/exhaust gas mixture measured by the gas temperature sensor, and a speed of the combustion engine.

14. The method as claimed in claim 10, wherein a determination of whether to use the second air mass flow rate fed to the combustion unit determined by the at least one of the charge air cooler model implemented in the control unit and the throttle valve model implemented in the control unit is made based on whether the combustion engine is in one of defined operating states of the combustion engine.

15. The method as claimed in claim 10, wherein the steps of calculating the first recirculated exhaust gas mass flow rate and calculating the first air mass flow rate are performed using a mass flow balance and energy balance of a system including the intake duct upstream of the exhaust gas admission region, the intake duct downstream of the exhaust gas admission region and upstream of the combustion chamber, and the exhaust gas recirculation system feeding the exhaust gas admission region.

16. The method as claimed in claim 10, further comprising conducting a plausibility check of the first recirculated exhaust gas mass flow rate using the second recirculated exhaust gas mass flow rate and a plausibility check of the first air mass flow rate using the second air mass flow rate.

17. The method as claimed in claim 10, further comprising determining to use the second recirculated exhaust gas mass flow rate and the second air mass flow rate for controlling the combustion engine depending on the operation mode of the combustion engine.

18. A vehicle having a combustion engine according to claim 1.

* * * * *